United States Patent [19]
Ganzi

[11] Patent Number: 5,259,936
[45] Date of Patent: *Nov. 9, 1993

[54] PURIFIED ION EXCHANGE RESINS AND PROCESS

[75] Inventor: Gary C. Ganzi, Lexington, Mass.

[73] Assignee: Millipore Corporation, Bedford, Mass.

[*] Notice: The portion of the term of this patent subsequent to May 18, 2010 has been disclaimed.

[21] Appl. No.: 717,459

[22] Filed: Jun. 19, 1991

[51] Int. Cl.⁵ .............................................. C25F 5/00
[52] U.S. Cl. ................... 204/131; 204/182.4; 204/182.5
[58] Field of Search .................. 204/182.4, 182.5, 131

[56] References Cited
U.S. PATENT DOCUMENTS
4,871,431 10/1989 Parsi ................................ 204/182.4
4,969,983 11/1990 Parsi ................................ 204/182.4

*Primary Examiner*—John Niebling
*Assistant Examiner*—Arun S. Phasge
*Attorney, Agent, or Firm*—Andrew T. Karnakis; Paul J. Cook

[57] ABSTRACT

Purified resin particles are provided in an electrodeionization step for purifying resin particles having ion depletion compartments containing the resin particles and ion concentration compartments. Purified water having a purity of at least 1 megohm-cm is introduced into the ion depletion compartments and water for accepting ionic impurities is introduced into the ion concentration compartments. The electrodeionization step for purifying resin particles is conducted under condition to dissociate water into hydrogen ions and hydroxyl ions. The purified water is produced in an initial water purification step which also can be an electrodeionization step. The water effluent from the ion depletion compartment can be recycled either to the initial water purification step or to the inlets of the ion depletion compartments in the resin particle purification process. The electrodeionization step comprising the initial water purification step is conducted under conditions to minimize or prevent hydrogen ion and hydroxyl ion formation.

4 Claims, 3 Drawing Sheets

PURIFIED ION EXCHANGE RESINS AND PROCESS

BACKGROUND OF THE INVENTION

This invention relates to a method for purifying resin particles and to the purified resin particle products so obtained.

Presently, electrodeionization is a process utilized to purify water to remove ions and ionizable compositions therefrom. In electrodeionization apparatus, the liquid to be purified is introduced into one or more ion depletion compartments containing anion exchange resin particles and cation exchange resin particles. The width of the ion depletion compartments is defined by ion permeable membranes which extend the length of the compartment and which, together with suitable spacers, serve to retain the resin particles in place. A second volume of liquid for accepting ions and ionizable compositions is passed through ion concentration compartments positioned adjacent the ion depletion compartments and separated therefrom by the ion permeable membranes. The ion concentration compartments may or may not contain ion exchange resin particles. The electrodeionization apparatus comprises a series of alternating ion depletion compartments positioned between an anode and a cathode and means for applying an electrical potential between the anode and the cathode. In use, the volume of the liquid being treated is depleted of ions, while the volume of the second liquid passed through the concentration compartments becomes enriched with the ions transferred through the ion permeable membranes and carries them in concentrated form to be discarded. The ion exchange resin particles serve as a path for ion transfer serving as an increased conductivity bridge between the membranes to promote ion movement. Under conditions of reduced liquid salinity, high voltage and low flow, the resins also convert to the $H^+$ and $OH^-$ forms due to the splitting of water into its ions in a thin layer at the surfaces of the resin particles or membranes. This further improves the attainable quality of water. During electrodeionization, the ion concentration within the resin particles is maintained relatively constant and the migration of ions from the resin particles into the concentration compartments is substantially balanced by the migrations of the same, or similar ions from the water being purified into the resin particles. Electrodeionization processes are contrasted with electrodialysis processes which do not utilize resin Particles within the ion depletion or concentration compartments.

Ion exchange resins also are utilized to purify water in a process which does not utilize electrical current. Water containing ions is contacted with resin particles in the hydrogen or hydroxyl form. The ions in solution then exchange with the hydrogen ions or hydroxyl ions by virtue of being contacted with the particles. After a finite time period of contact with impure water, the capacity of the resin for ion exchange is substantially reduced and the water product is insufficiently purified. At this point in the process, the ion exchange resin particles are replaced with ion exchange resin particles in the hydrogen or hydroxyl form. The depleted resin then is regenerated either by being contacted with an acid to produce hydrogen-form resin or with a base to produce hydroxyl-form resin. In either instance, the regeneration process is undesirable since toxic by-products are produced.

At the present time, resins are purified or regenerated by separating anionic resins and cationic resins from their mixtures and contacting them with a large excess concentration of a given ion for a sufficient amount of time. Ions other than the regenerant ion are excluded from the resin approximately in proportion to the ratio of regenerant ion concentration to the concentration of the other ions, with the proportionality constant being dependent upon the specific ions and resins in question. Since regenerants are normally used at concentrations of about $10^5$ ppm, the other ions in the regenerant solution are present at concentrations of about $10^1$ to $10^3$ ppm, the proportion of regenerant to impurity remaining in the resins typically in the ratio of $10^4$ to $10^2$, depending on the selectivity of the resin for regenerant versus impurity. Although it may be possible to regenerate resins using regenerants of higher purity, this is impractical due to the cost of producing and maintaining ultra-pure regenerants. When anionic and cationic resins are mixed, the separation step is difficult and is never completely accomplished. This failure causes additional contamination as resin regenerated with regenerant used for resin of a different type acts as an impurity.

When regenerated resins are placed in an environment where the concentration of regenerant ions are much lower than that of the regenerant solution, they are capable of effecting high purification factors. For example, the hydrogen ion and hydroxide ion concentrations in water are $10^{-4}$ to $10^{-3}$ ppm, which means that, when treating water with the regenerated resin, there is a large driving force to remove other ions from the water. The water ions are not sufficiently concentrated to leach any substantial amounts of impurities that remain on the ion exchange resin as a result of the prior contact with the regenerant solution originally containing these impurities.

At the present time, the purity requirements for critical solutions such as those used in the electronics industry, are becoming more stringent to the point that even the small amount of impurity ions on the regenerant-treated ion exchange resins become a significant undesirable factor. This is a particular problem when purifying solutions having a high concentration of the regenerant ion. In addition to impurities introduced onto ion exchange resins by regenerant solutions and unseparated resins of opposite charge, the resins contain other microimpurities within their matrices, namely unexcluded co-ions and uncharged materials such as organics that are included within the matrix during resin synthesis or regeneration, or that are formed by resin degradation during storage and use. When the concentration of regenerant ions in the solution to be purified is higher than the concentration of the ions in the solution used during regeneration, it is clear that in most cases, the solution being purified cannot be purified to a level better than the purity of the regenerant.

Accordingly, it would be desirable to provide resin particles having a purity which exceeds that of resin particles available from presently used resin regeneration or purification processes.

SUMMARY OF THE INVENTION

The present invention provides a process for purifying resin particles, such as ion exchange resin particles, by a first polishing step or an electrodeionization step which utilizes a purified water feed for ion depletion compartments containing the resin. The purified water comprises at least 1 megohm-cm water. When utilizing electrodeionization to produce the purified water feed, the water can be continuously recycled between the purification step of this invention and the electrodeionization step or recycled from the outlets to the inlets of the ion depletion compartments of the electrodeionization step. The electrodeionization step or steps preferably are conducted in an apparatus wherein the ion depletion compartments are formed from ion permeable membranes and a spacer having a hollow central portion divided by ribs or the like to define ion depletion subcompartments and ion concentration subcompartments. The resin purification electrodeionization step is conducted under conditions to disassociate pure water adjacent the ion permeable membranes and resin particles to form hydrogen ions and hydroxyl ions. The hydrogen ions and hydroxyl ions then are exchanged with cations and anions respectively in the resin particles located in the ion depletion compartments positioned on either side of a concentration compartment.

In the preferred electrodeionization step to produce purified water, the ion exchange resin beads are retained in the subcompartments by bonding or physically restraining a cationic permeable membrane to one surface of the ion depletion compartments and to the ribs and bonding or physically restraining an anionic permeable membrane to the opposing surface of the ion depletion compartment and to the ribs, thereby to define the subcompartments the electrodeionization apparatus can comprise a single stage or a plurality of stages in series wherein the process voltage can be controlled independently in each stage, if desired. Representative suitable electrodeionization steps are disclosed in U.S. Pat. Nos. 4,632,745; 4,747,929; 4,804,451, 4,956,071 and application number 417,950 filed Oct. 6, 1989 which are incorporated herein by reference. The resin purification step is capable of electrochemically producing hydrogen and hydroxyl ions at about $10^4$ parts per million (ppm) or more from water which contains only $10^{-2}$ to $10^{-5}$ ppm levels of impurities. The ratio of regenerant hydrogen and hydroxyl ions to impurity is $10^6$ to $10^9$ or more which is approximately two to five orders of magnitude better than the presently available chemicals practically available for resin regeneration. When utilizing resins having the purity described above, liquid purification of $10^{-5}$ ppm or less contaminants can be obtained depending on the concentration of regenerant ions in the solution to be purified. Depending on the configuration of the apparatus, either anionic, cationic or mixtures of anionic and cationic resins can be regenerated thereby eliminating the need to separate mixed bed resins. In addition, single resins containing both anionic and cationic groups (amphoteric) can be regenerated to the $H^+$ and $OH^-$ forms.

DESCRIPTION OF SPECIFIC EMBODIMENTS

Figure 1:
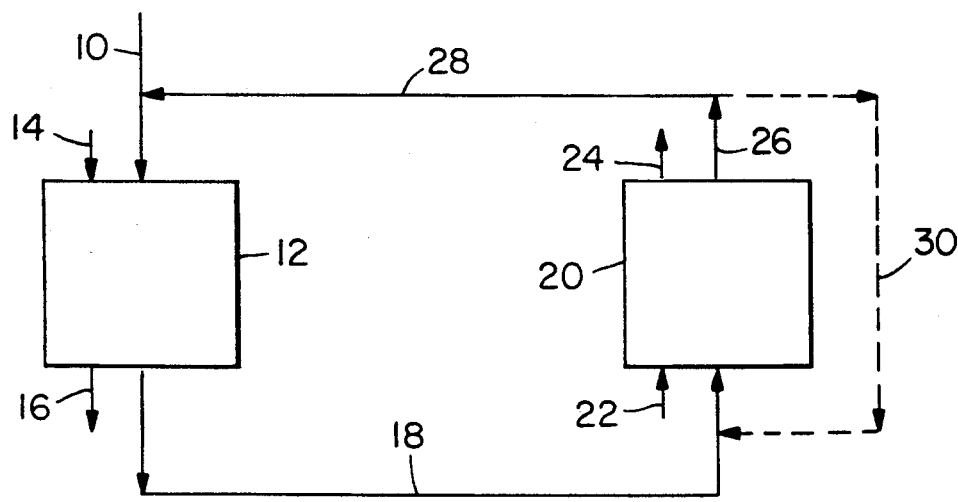
FIG. 1 is a schematic veiw of a process which can be utilized to produce pure water or to purify resin particles.

In accordance with this invention, resin particles are purified in the ion depletion compartments of an electrodeionization step containing the resin particles to be purified. The water introduced into these ion depletion compartments is purified to a level of at least 1 megohm-cm resistivity prior to being introduced into the ion depletion compartments. Water purification can be effected in a separate electrodeionization step which utilizes ion depletion compartments having a controlled configuration or in a water polishing process such as is described in U.S. Pat. No. 4,430,226 which is incorporated herein by reference or by any other means. The means for purifying water described in U.S. Pat. No. 4,430,226 comprises a cartridge containing a particulate admixture of activated carbon and mixed ion exchange resins. This cartridge is utilized in the Milli Q ™ water purifier apparatus available from Millipore Corporation, Bedford, Massachusetts, which comprises four water treatment cartridges containing sequentially, activated carbon, ion exchange resin, and finally the activated carbon/ion exchange resin mixture which is capable of producing 18 meg-ohm high purity water essentially free of organics.

A configuration of the ion depletion compartments of the electrodeionization apparatus which can be utilized in the present invention is disclosed in U.S. Pat. Nos. 4,632,745; 4,747,929 and 4,804,451, which are incorporated herein by reference. Briefly, the ion depletion compartments have a space in which a plurality of subcompartments are formed by a plurality of ribs that extend along the length of the ion depletion compartments. Inlet and outlet means are provided to permit passage of water through the compartment. The thickness of the subcompartments is defined by an anion permeable membrane bonded to one surface of the spacers and the ribs and by a cation permeable membrane bonded to a second surface of the spacers and the ribs. The width of the subcompartment is defined by the distance between adjacent ribs.

The thickness of the subcompartment should be between about 0.25 and about 0.05 inches, preferably between about 0.06 and 0.125 inches. The width of the subcompartment should be between about 0.3 and about 4 inches, preferably between about 0.5 and about 1.5 inches. There is no limit on the length of the compartment other than as dictated by practical construction and fluid pressure loss considerations. The longer the subcompartment length, the greater the ion removal from the liquid therein. Generally, the length of the subcompartments are between about 5 inches and about 70 inches. The subcompartments can contain 100% anion exchange material, 100% cation exchange material or a mixture of the two. By utilizing the subcompartment structure in the depleting compartments, efficient mixing of the liquid and the beads therein is attained while avoiding channeling of the liquid through the depleting compartments, as well as avoiding compaction or movement of the beads within a portion of the volume of the depleting compartment. Thus, efficient interchange of the ions in the liquid in the depleting compartment with the ions in the beads to effect ion removal from the liquid and from the beads in the depleting compartment is attained. However, it is to be understood that the purified water utilized in the present invention can be obtained from any source. The electrodeionization process described above comprises a preferred source of the purified water since it can be utilized both as a source of purified water and as the means for purifying the resin particles as set forth below.

All resins having ionic sites can be purified in accordance with this invention to produce the hydrogen form or the hydroxyl form of the purified resin. Representative particulate resins which can be purified in accordance with this invention include gel and macroporous ion exchange resins such as sulfonated polystyrene-divinylbenzene and aminated polystyrene-divinylbenzene either in pure form or in mixtures (Type I or Type II) such as those available under the trademark DOWEX from the Dow Chemical Company; and; chromatography resins; bifunctional ion exchange resins such as ion retardation resins (Biorad AG11A8) or ion exchange resins containing both sulfonate and quaternary amine functionality, sulfonated phenolic resin, polystyrene phosphonic acid or iminodiacetic acid resins, aminated acrylic or methacrylic resins, epoxy polyamine resins, aminoethyl cellulose or the like.

The purified anion resin particles produced by the process of this invention contain an order of magnitude less impurities as compared to presently available resins. That is, anion resin particles contain less than about 1% of anionic impurities other than hydroxyl ion or the purified cation resin particles produced by the process of this invention contain less than about 0.1% of cationic impurities other than hydrogen ion.

In accordance with the process of this invention an electrodeionization process is conducted under conditions to dissociate water adjacent the ion permeable membranes and the resin particles to form hydrogen ion and hydroxyl ions. The hydrogen ion is exchanged with cation impurities in the resin particles while the hydroxyl ion is exchanged with anion impurities in the resin particles. The ionic impurities migrate through the ion permeable membranes into the concentration compartments of the electrodeionization apparatus. Suitable conditions for forming hydrogen and hydroxyl ions include feed water of purity of at least 1 megohm-cm, a minimum diluting cell voltage of at least one volt and an operating current efficiency (transfer of salt ions to $H^+$ or $OH^-$) of about 30% or less.

In another aspect of this invention, purified water can be produced by exposing impure water to ultraviolet (UV) light prior to being purified in an initial electrodeionization step. Water is purified continuously to effect ion removal and essentially complete removal of total organic carbon (TOC) by exposure to ultraviolet radiation to effect oxidation of organics followed by the electrodeionization. In the ultraviolet radiation exposure step, water is exposed to radiation having a wavelength that promotes oxidation of organics, e.g., 184.9 nanometers. In the electrodeionization step, the water is passed through one or more depletion compartments to produce high resistivity (megohm-cm) water continuously. The organics treated in the ultraviolet radiation exposure step are passed from the water in the ion depletion compartments through ion permeable membranes into adjacent concentration compartments within the electrodeionization step. Additional process steps can be added such as an ultrafiltration step in order to further improve product purity.

Referring to FIG. 1, either water to be purified or pure water is introduced through conduit 10 into water purification step 12 adapted to produce at least 1 megohm-cm water. When step 12 is an electrodeionization step for purifying water, water from conduit 10 is introduced into ion depletion compartments containing ion exchange resin beads, preferably a mixture of anion exchange resin and cation exchange resin so that anion and cation impurities are removed from the water. Also, when step 12 is an electrodeionization step, water for accepting ions from the water to be purified is introduced through conduit 14 into concentration compartments of step 12 and is removed through conduit 16 to be discarded. In electrodeionization step 12, conditions are maintained to minimize or prevent hydrogen ion or hydroxyl ion formation using a current efficiency of about 30% or greater so that transfer of ions to the resin bed other than hydroxyl or hydrogen ion is maximized. The purified water is directed through conduit 18 to ion depletion compartments in electrodeionization step 20. Concentrate water is introduced through conduit 22 into concentration compartments in step 20 and is removed therefrom by conduit 24 to be discarded. In electrodeionization step 20, ion impurities in the resin bed migrate through the ion permeable membranes into the water in the ion concentration compartments so that both the resin beads and water in the ion depletion components become depleted of ions other than hydrogen and hydroxyl ions. In electrodeionization step 20, conditions are controlled so that water is dissociated to hydrogen ion and hydroxyl ion. Suitable conditions include a water feed of 1 megohm-cm or greater, a voltage of greater than 1 volt in the diluting compartments and a current efficiency of less than about 30%. The purified water passes through conduit 26 to be recycled either through conduit 28 to the ion depletion compartments of electrodeionization step 12 or through conduit 30 to the ion depletion compartments of electrodeionization step 20. By continuous recycling of the increasingly pure water as described, the resin beads in the ion depletion compartments in step 20 are rendered substantially completely free of ion impurities. The pure beads then are removed from the ion depletion compartments of step 20 for use as described, while step 12 can remain intact for subsequent use to purify water as described herein.

Figure 2:
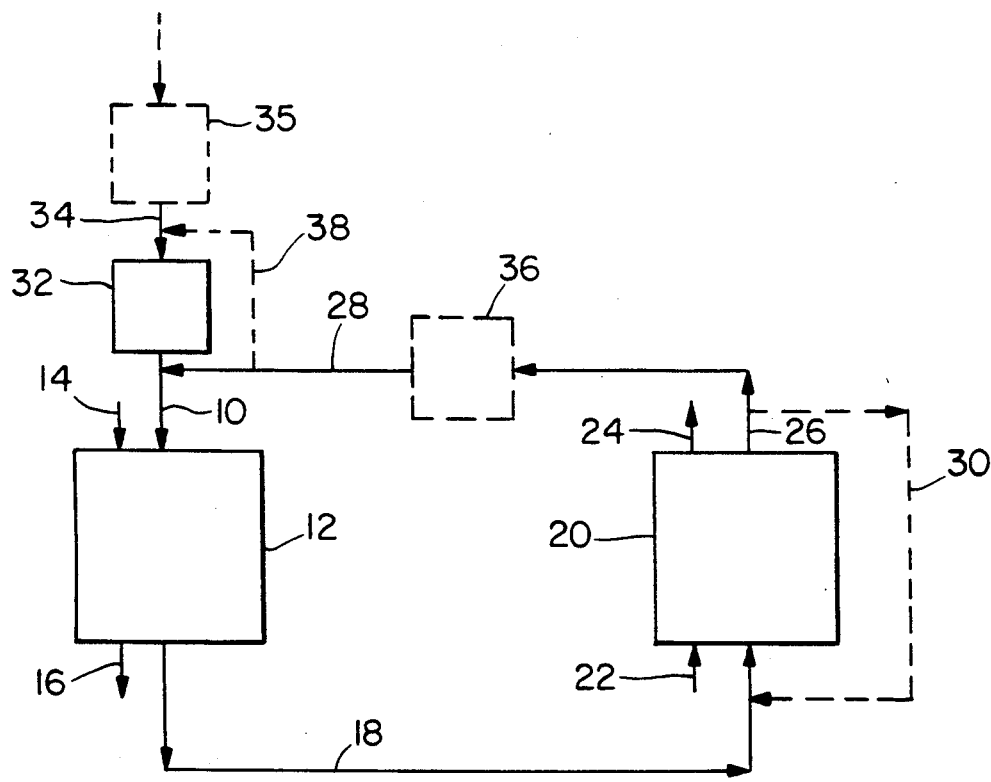
FIG. 2 is a schematic veiw of an alternate process which can be utilized to produce pure water or to purify resin particles.

Referring to FIG. 2 where like numerals refer to the same elements described above with reference to FIG. 1. Either water to be purified or pure water is introduced through conduit 34 into step 32 for exposure to UV light to assist in TOC removal as described above. If desired, the water to be purified can be treated in a preliminary treatment step 35, such as reverse osmosis. The water is directed through purification step 12, conduit 18, and electrodeionization step 20 where ionized products produced from TOC in step 32 are removed from the water with ion impurities. The purified water can be subjected to an additional purification step 36 such as ultrafiltration. The purified water can be recycled through conduits 28, 38 and 34 to UV treatment step 32 or through conduits 28 and 10 to purification step 12 or through conduits 26, 30 and 18 to electrodeionization step 20. Steps 12 and 20 are the same as those conditions described above with reference to FIG. 1. The water and resin beads in the electrodeionization steps become increasingly purified as described above. The pure resin beads are then recovered from step 20.

Figure 3:
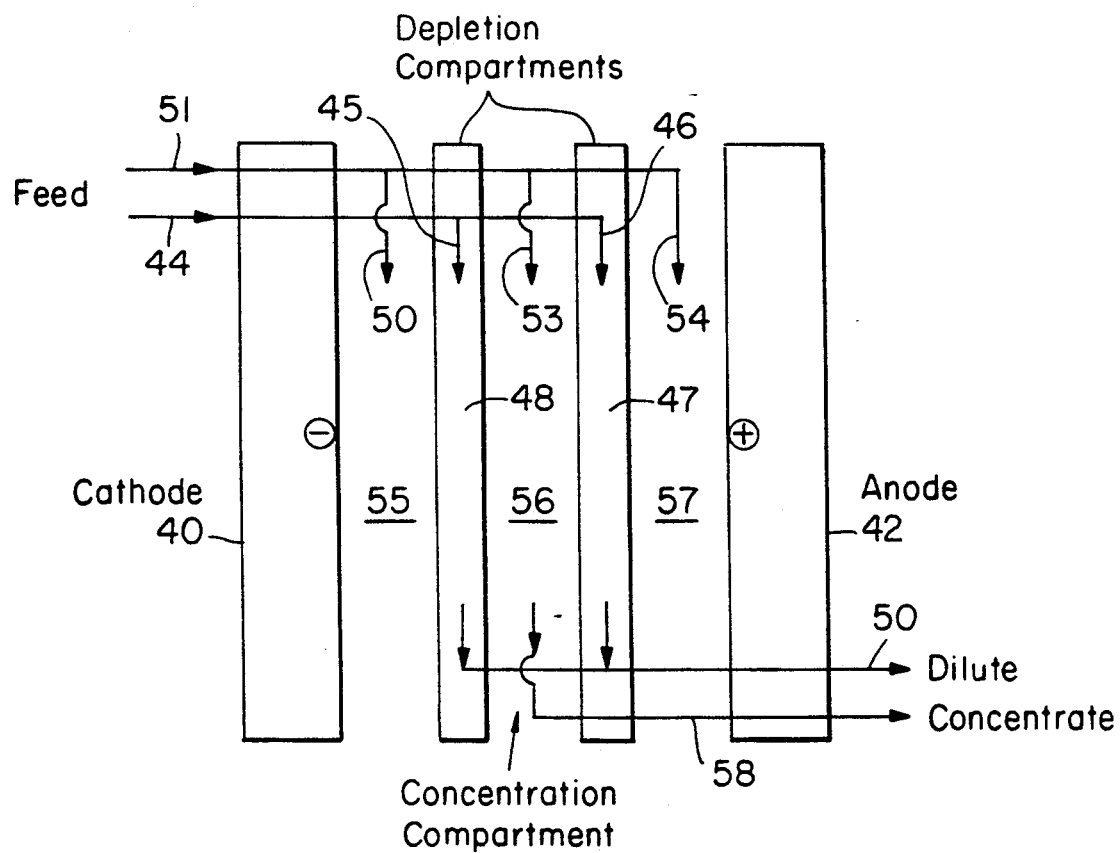
FIG. 3 illustrates a process flow arrangements within electrodeionization apparatus useful for purifying resin particles.

Referring to FIG. 3, an electrodeionization arrangement is shown wherein water to be purified is passed once between a cathode 40 and an anode 42. The water to be purified is passed through conduits 44, 45 and 46, through ion depletion compartments 47 and 48 and is recovered through conduit 50. Concentrate water is passed through conduits 51, 52, 53 and 54, through ion concentration compartments 55, 56 and 57 and is discarded through conduit 58.

Figure 4:
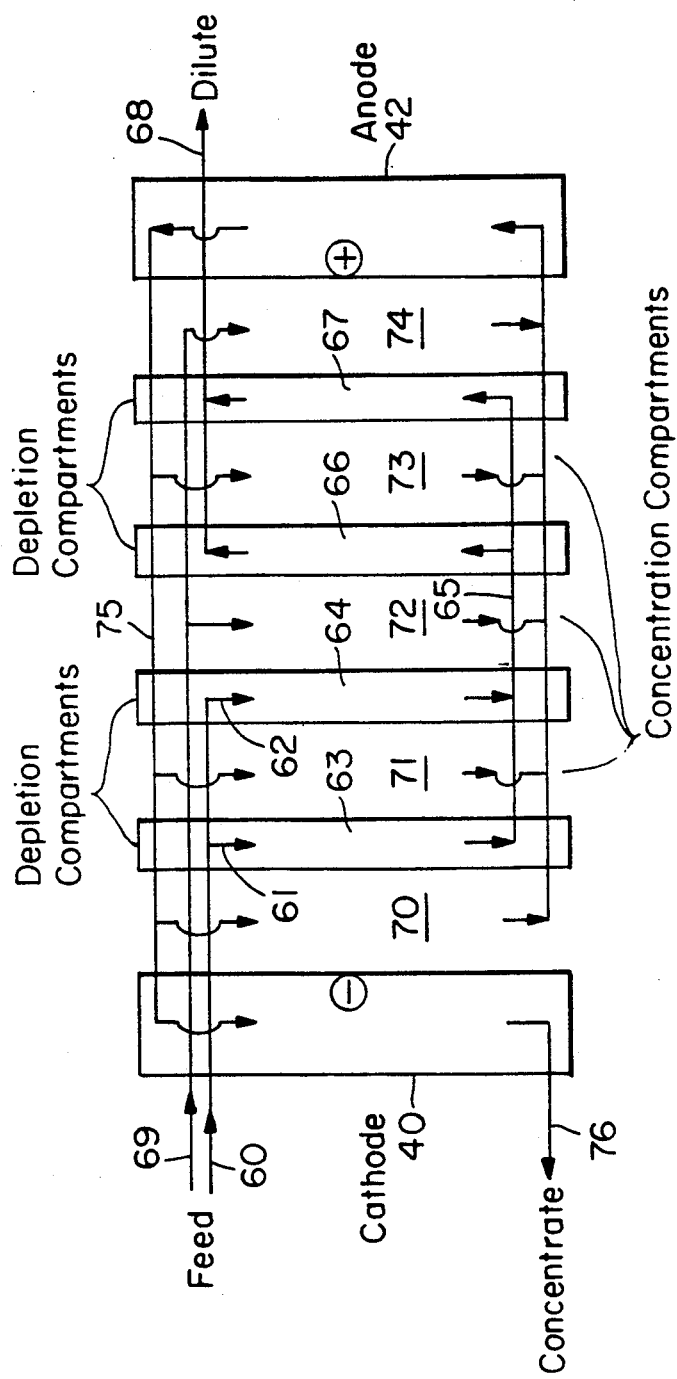
FIG. 4 illustrates an alternative process flow arrangement within an electrodeionization apparatus useful for purifying resin particles.

As shown in FIG. 4, water to be purified can be directed through more than one ion depletion compartment positioned between a set of an anode 42 and cathode 40. Water to be purified is passed through conduits 60, 61 and 62 through ion depletion compartments 63 and 64, through conduit 65, and then through ion depletion compartments 66 and 67. The purified water is recovered through conduit 68. Concentrate water is directed through conduit 69, through ion concentration compartments 70, 71, 72, 73 and 74, through anode compartment 42, conduit 75, cathode compartment 40 and is discarded through conduit 76. If desired, additional ion depletion compartments can be utilized while continuing the serpentine flow illustrated.

I claim:

1. A process for purifying resin particles to produce resin particles containing less than about 1% anionic impurities other than hydroxyl ion or less than about 0.1% cationic impurities other than hydrogen ion which comprises:
   providing a purified water stream having a purity of at least about 1 megohm-cm,
   passing said purified water stream through ion depletion compartments containing said resin particles in an electrodeionization apparatus,
   said electrodeionization apparatus comprising;
   a cathode compartment at a first end of said apparatus,
   an anode compartment at an end of said apparatus opposite said first end,
   a plurality of said ion depletion compartments alternating with ion concentration compartments positioned between said cathode compartment and said anode compartment,
   passing a second liquid for accepting ions from said purified water through said concentration compartments while said purified water is passed through said ion depletion compartments, and applying an electrical voltage between an anode in said anode compartment and a cathode in said cathode compartment under condition to dissociate water to form hydrogen ions and hydroxyl ions.

2. A process for purifying resin particles to produce resin particles containing less than about 1% anionic impurities other than hydroxyl ion or less than about 0.1% cationic impurities other than hydrogen ion which comprises:
   providing a purified water stream having a purity of at least about 1 megohm-cm,
   passing said purified water stream through ion depletion compartments containing said resin particles in an electrodeionization apparatus,
   said electrodeionization apparatus comprising;
   a cathode compartment at a first end of said apparatus,
   an anode compartment at an end of said apparatus opposite said first end,
   a plurality of said ion depletion compartments alternating with ion concentration compartments positioned between said cathode compartment and said anode compartment,
   passing a second liquid for accepting ions from said purified water through said concentration compartments while said purified water is passed through said ion depletion compartments,
   applying an electrical voltage between an anode in said anode compartment and a cathode in said cathode compartment under conditions to dissociate water to hydrogen ions and hydroxyl ions,
   recovering second stage purified water from said ion depletion compartments, and recycling said second stage purified water to said ion depletion compartments for a sufficient time period to form purified resin particles in said ion depletion compartments, and recovering said purified resin particles.

3. The process of any one of claims 1 or 2 wherein said purified water stream is produced by an electrodeionization purification step.

4. The process of any one of claims 1 or 2 wherein said purified water stream is produced by an electrodionization purification step and is exposed to ultraviolet radiation prior to being introduced into said electrodeionization purification step.

* * * * *